No. 753,229. PATENTED MAR. 1, 1904.
T. J. BURNS & F. O. CASTEEL.
CUSPIDOR.
APPLICATION FILED SEPT. 28, 1903.
NO MODEL.
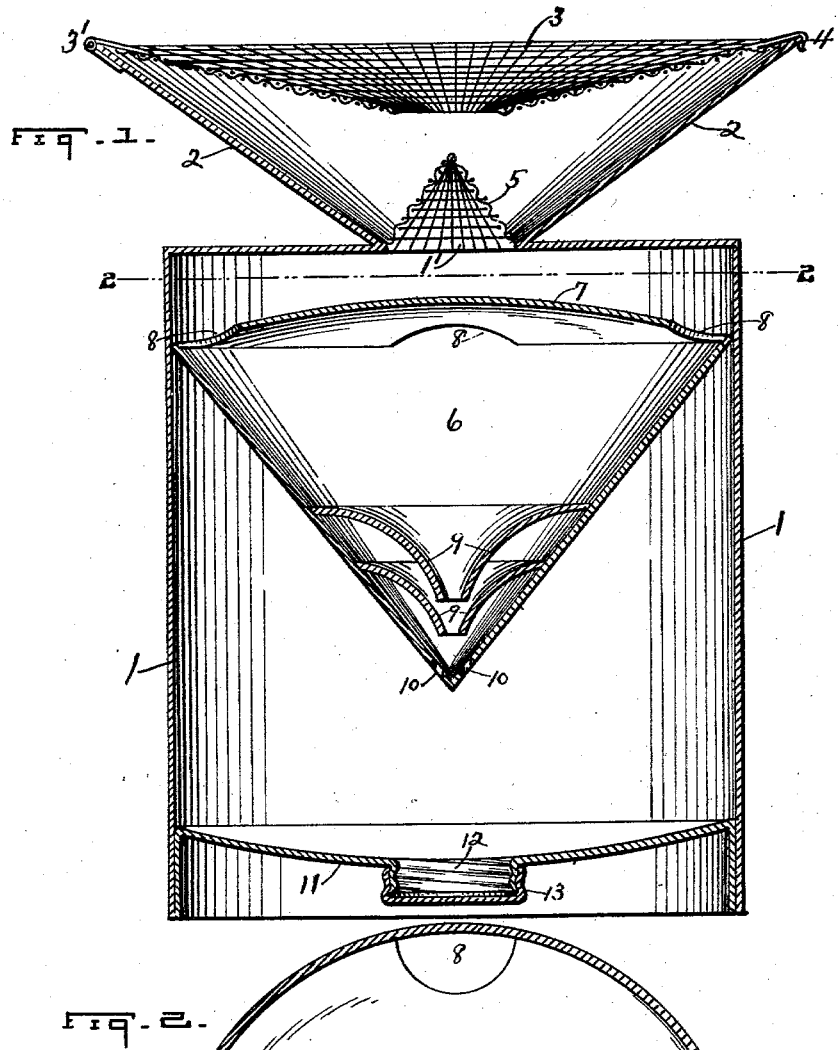

UNITED STATES PATENT OFFICE.

TIMOTHY J. BURNS AND FREDERICK O. CASTEEL, OF PITTSBURG, PENNSYLVANIA; SAID CASTEEL ASSIGNOR TO SAID BURNS.

CUSPIDOR.

SPECIFICATION forming part of Letters Patent No. 753,229, dated March 1, 1904.

Application filed September 28, 1903. Serial No. 174,999. (No model.)

*To all whom it may concern:*

Be it known that we, TIMOTHY J. BURNS and FREDERICK O. CASTEEL, citizens of the United States, residing at Pittsburg, in the county of Allegheny and State of Pennsylvania, have invented certain new and useful Improvements in Cuspidors, of which the following is a specification.

This invention relates to certain new and useful improvements in cuspidors whereby the same may be upset or turned upside down without spilling any of the contents.

The object of our invention is to provide a simple and practical cuspidor having the above object in view.

In the accompanying drawings, forming a part of this specification, Figure 1 is a side sectional view of our improved cuspidor, showing the interior construction of the same. Fig. 2 is a plan view of the top portion of the trap-funnel used in the inside of our invention.

In the drawings numerals of reference designate like parts throughout both views, in which—

The numeral 1 is the body of the cuspidor, having an opening 1' in the top thereof. 2 is a funnel-shaped portion attached to the top of the same.

3 is a wire netting or screen hinged to the top edge of the funnel-shaped portion at 3'.

4 is a spring snap or locking device fixed to the wire screen 3.

5 is a fixed wire screen at the bottom of the funnel portion 2 and covering the opening 1'.

6 is a funnel-shaped trap rigidly fixed to the inside walls of the cuspidor a short distance from the top. 7 is a concave-shaped cover over said funnel trap 6, having the openings 8 therein.

9 represents circular concave-shaped inverted cups rigidly fixed to the inside walls of the funnel trap 6 near the lower portion. 10 represents outlet-openings at the lower end of said funnel trap 6.

11 is the receding bottom of the cuspidor, having an opening 12, covered by a cap 13.

When in use, the spittle will be introduced into the funnel-shaped portion 2, after which it will pass through the opening 1' and drop onto the concave top of the funnel trap 6, then through the openings 8 in said top portion and out through the funnel trap at the openings 10. If the cuspidor should be upset or turned upside down, the spittle would run to the chamber formed by the inner walls of the cuspidor and the sides of the funnel trap 6, thus being prevented from escaping or spilling out. If any spittle should happen to escape back through the openings 10 into the funnel trap 6, it will be caught and held by the inverted cups 9 and top portion 7 of said trap. Any cigar-stumps or other foreign matter thrown into the cuspidor will lodge against the wire screen 5, and when the cuspidor is upset or turned over said foreign matter will lodge against the top screen 3, thus being prevented from spilling out onto the floor. When it is desired to remove any such foreign matter, the snap-catch 4 is unfastened and the screen 3 thrown back.

By introduction of water the interior of the cuspidor can be thoroughly flushed and cleaned and the spittle emptied therefrom by removing the cap 13.

In our construction of a cuspidor it will be seen that the spittle is always kept out of sight and the fumes arising from the same confined to the interior of the cuspidor.

Having thus fully shown and described our invention, what we claim as new, and desire to secure by Letters Patent, is—

In a device of the type set forth, the combination with the body of a cuspidor having a central opening therein, a guard arranged in the opening, a funnel-shaped trap arranged beneath said opening having a convex top provided with openings in the periphery thereof, said trap being further provided with openings near the bottom thereof, and a series of guard-cups disposed one above the other near the lower end and above the openings in the trap, substantially as described.

In testimony whereof we affix our signatures in presence of two witnesses.

TIMOTHY J. BURNS.
FREDERICK O. CASTEEL.

Witnesses:
E. C. YOST,
H. W. STEVENSON.